United States Patent [19]

Bednarsky et al.

[11] Patent Number: 5,508,852
[45] Date of Patent: Apr. 16, 1996

[54] DRIVE UNIT FOR THE ADJUSTMENT OF A ZOOM, FOCUS OR IRIS DIAPHRAGM FOR CAMERA LENSES

[75] Inventors: Kurt Bednarsky, Vienna; Pavel Filous, Guntramsdorf, both of Austria; Eugen Bayerl, Kirchheim; Karl Herzog, Taufkirchen, both of Germany

[73] Assignee: Arnold & Richter Cine Technik GmbH & Co., Munich, Germany

[21] Appl. No.: 317,292

[22] Filed: Oct. 3, 1994

Related U.S. Application Data

[63] Continuation of Ser. No. 78,569, Jun. 17, 1993, abandoned.

[30] Foreign Application Priority Data

Jun. 17, 1992 [DE] Germany .......................... 42 20 129.2

[51] Int. Cl.$^6$ .............................. G02B 7/02; G02B 15/14
[52] U.S. Cl. .......................... 359/823; 359/697; 359/704
[58] Field of Search ..................... 359/694–706, 359/819, 823, 896

[56] References Cited

U.S. PATENT DOCUMENTS

| 2,797,618 | 7/1957 | Bloomberg et al. | 359/670 |
| 2,940,373 | 6/1960 | Berg et al. | 354/195.12 |
| 3,239,417 | 8/1963 | Eguchi et al. | 359/698 |
| 3,324,780 | 6/1967 | Hiyauchi | 359/696 |
| 4,057,327 | 11/1977 | Kumazawa | 359/696 |
| 4,235,509 | 11/1980 | Takabayashi | 359/696 |

FOREIGN PATENT DOCUMENTS

| 97910 | 4/1989 | Japan | 359/696 |
| 596560 | 3/1978 | Switzerland . | |

*Primary Examiner*—Thong Q. Nguyen
*Attorney, Agent, or Firm*—Christie, Parker & Hale

[57] ABSTRACT

The invention relates to a drive unit for the adjustment of the zoom, focus or iris ring of a camera lens. According to the invention, the drive unit comprises a drive shaft arranged parallel to the axis of the camera lens, a pin and groove arrangement for allowing axial displacement of the drive shaft, a pinion connected to the drive shaft and coupled to the external teeth of a lens ring of the camera lens, and two circular flanges connected to the drive shaft and for embracing a sector of the lens ring to pull along the drive shaft and the pinion as the lens ring moves axially. The invention creates a drive unit which allows adjustment of a lens ring even if the lens ring is displaced axially.

5 Claims, 2 Drawing Sheets

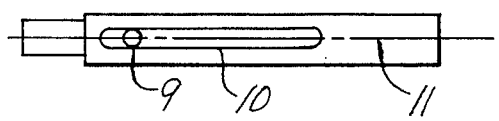
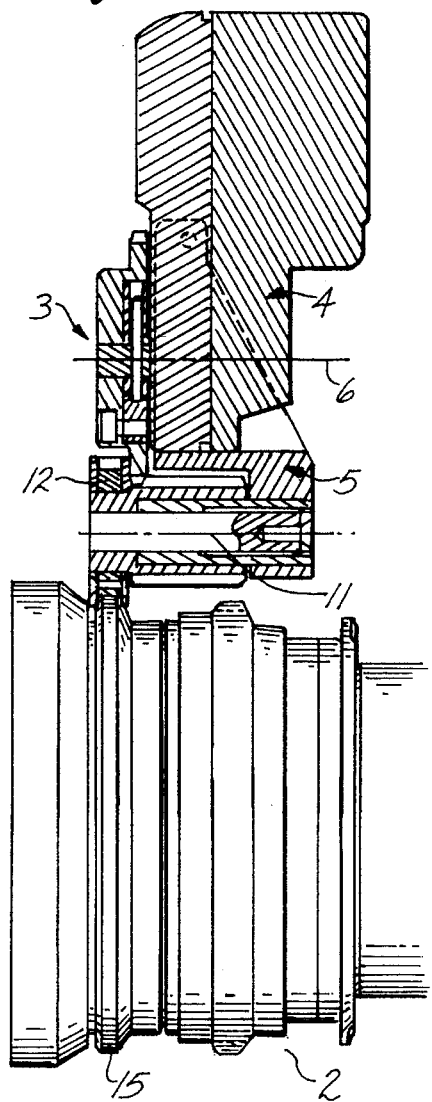
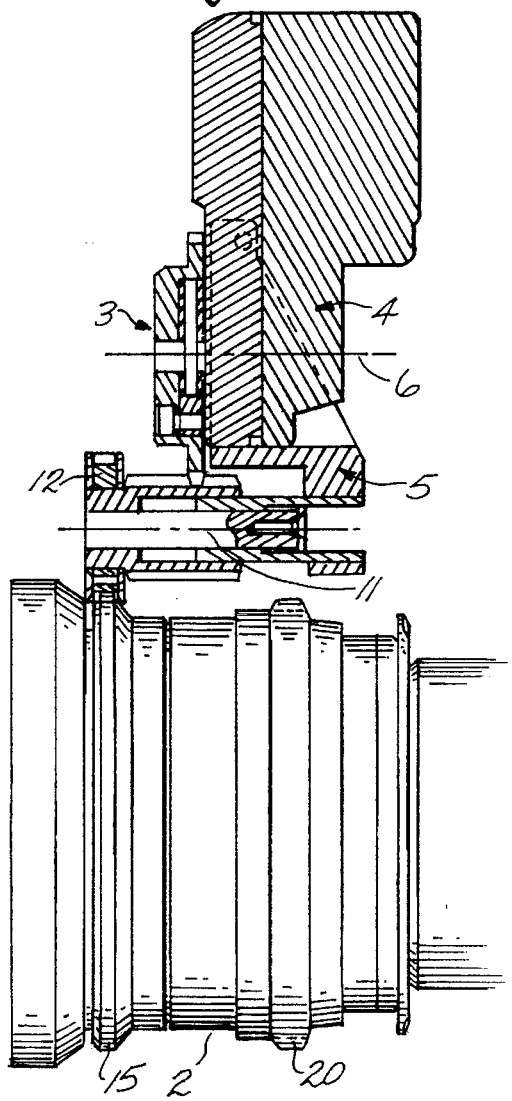

DRIVE UNIT FOR THE ADJUSTMENT OF A ZOOM, FOCUS OR IRIS DIAPHRAGM FOR CAMERA LENSES

CROSS REFERENCE TO RELATED APPLICATION

This is a continuation of application Ser. No. 08/078,569, filed Jun. 17, 1993, now abandoned.

BACKGROUND OF THE INVENTION

The invention relates to a drive unit for the adjustment of the zoom, focus or iris ring of a camera lens.

The adjustment of the iris diaphragm aperture, the sharpness (focus), and the focal length (zoom) of a camera lens is carried out by means of lens rings which are positioned accordingly. For an easy and reliable positioning of the lens rings, drive units are used which are disposed vertically or horizontally at a camera lens. Each motor unit is coupled via a pinion or the like to the external teeth of a lens ring and may thus cause a setting of the lens ring.

However, frequently the problem arises that during the positioning of a lens ring the lens ring is displaced in an axial direction leading to a condition in which the pinion of the respective motor unit is not able to engage in the external teeth of the lens ring anymore. Thus, a further adjustment of the lens ring is not possible.

This problem especially arises if narrow lens rings or narrow pinions are used. However, the cramped building space around a camera often requires the lens rings and the pinions to be narrow.

The described problem particularly arises with regard to narrowly designed iris rings situated in front of the focus ring of a camera lens with a fixed focal length. When adjusting the focus, the iris ring may easily move out of the zone in which the pinion of the drive unit for adjusting the iris diaphragm is able to engage the external teeth of the iris ring.

Depending on the type of lens ring, the described problem may also occur at the zoom ring, the focus ring or an iris ring arranged behind the zoom ring or the focus ring.

SUMMARY OF THE INVENTION

According to the invention, a drive unit for the adjustment of the zoom, focus or iris ring of a camera lens comprises a motor unit, a drive shaft connected to the motor unit and arranged parallel to the axis of the camera lens, means for allowing axial displacement of the drive shaft, a pinion connected to the drive shaft and coupled to the external teeth of a lens ring, and means connected to the drive shaft and for embracing a sector of the lens ring to pull along the drive shaft and the pinion if the lens ring moves axially.

The invention creates a drive unit for the adjustment of the zoom, focus or iris diaphragm of a camera lens which allows an easy and reliable adjustment of a lens ring even in case the lens ring is moved axially.

The inventive solution overcomes the described problem by using a drive shaft which is axially displaceable and whose axial displacement is coupled via means for embracing the lens ring to the axial displacement of the lens ring. The pinion connected to the drive shaft is carried along with the lens ring. Thus, the inventive solution allows the pinion and the external teeth of a respective lens ring to be in a constant position relative to each other. A reliable engagement of the pinion in the external teeth of the lens ring is guaranteed even if the lens ring is axially displaced while being adjusted or during adjustment of another lens ring.

It is irrelevant, whether the axial displacement of a lens ring is caused by adjusting the respective lens ring itself or by adjusting another lens ring of the camera lens.

By displacing the drive unit together with the lens ring, the inventive solution allows the lens ring and the pinion to be designed to be especially narrow. This decreases the manufacturing costs and the size of the setup of camera lens and drive unit.

In a preferred embodiment of the invention the means for embracing a sector on the lens ring consists of two essentially circular flanges situated along the drive shaft at each side of the pinion. Each flange abuts against one lateral working surface of the lens ring. The lens ring is embraced by the two flanges. In case of an axial displacement of the lens ring the two flanges and thus the pinion situated in between the flanges and the drive shaft connected to the flanges are carried along.

The flanges are secured to the pinion so that the pinion and the flanges rotate jointly. Such an arrangement prevents a grinding of the flanges at the lateral working surfaces of the lens ring.

The drive shaft preferably includes a longitudinal groove in which a pin engages vertically. The pin is firmly connected to a rotating drive gear and transmits the rotation of the drive gear to the drive shaft. By guiding the pin in the longitudinal groove an axial displacement of the drive shaft is possible while at the same time the rotation of the drive gear is transmitted to the drive shaft.

BRIEF DESCRIPTION OF THE DRAWINGS

The features of a specific embodiment of the best mode contemplated of carrying out the invention are illustrated in the drawings, in which:

FIG. 2 is a bottom plan view of a drive shaft having a longitudinal groove;

FIG. 3 is a transverse sectional view of a drive shaft;

FIG. 4a is a sectional view of a drive unit and a camera lens in a specific position; and FIG. 4b is a sectional view of a drive unit and a camera lens in another specific position.

DETAILED DESCRIPTION OF THE SPECIFIC EMBODIMENT

Figure 1:
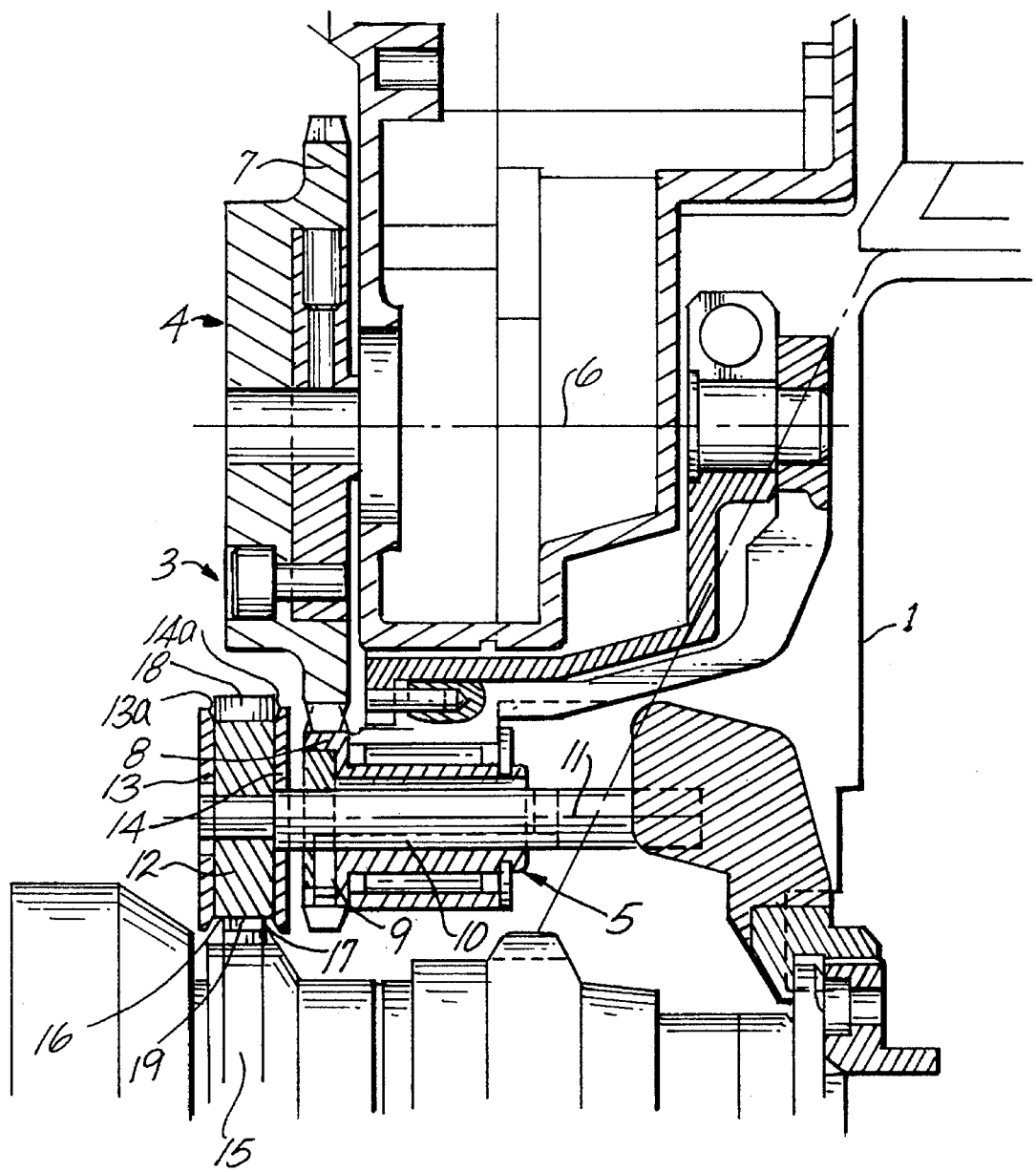
FIG. 1 is a sectional view of a drive unit.

FIG. 1 depicts a motion picture camera 1 with a camera lens 2 and a drive unit 3 consisting of a motor unit 4 and a gear unit 5 situated next to the camera lens 2. A gear wheel 7 of the motor unit 4 is driven by a motor shaft 6. The gear wheel 7 engages a drive gear 8 of the gear unit 5.

The drive gear 8 is secured to the motor unit 4. Fixed to the drive gear 8 is a pin 9 which engages perpendicularly the longitudinal groove 10 of a drive shaft 11 (See FIGS. 2 and 3). A pinion 12 with teeth 18 is situated at one end of the drive shaft 11. The pinion 12 and the drive shaft 11 have the same axis of rotation.

Two circular flanges 13 and 14 are situated in front of and behind the pinion 12, respectively. The flanges 13, 14 are connected tightly and without clearance to the drive shaft 11 and the pinion 12. The diameter of the flanges 13, 14 is slightly greater than the minimum diameter of the pinion 12, i.e. the diameter with regard to the base of the teeth 18 of the pinion 12. The surface of each flange 13, 14 has a wedge-shaped bevel 13a and 14a, respectively, at the side facing the pinion 12.

The rotation of the motor shaft 6 is transmitted to the drive gear 8 via the gear wheel 7. The pin 9 rotates together with the drive gear 8. It engages the longitudinal groove 10 of the drive shaft 11 and thus transmits the rotation of the drive gear 8 to the drive shaft 11.

During axial displacement of the drive shaft 11 as it may occur within the course of the adjustment of a lens ring, the pin 9 is guided within the longitudinal groove 10.

Consequently, the transmission of the rotation of the drive gear 8 to the drive shaft 11 via the pin 9 is maintained even in case of axial displacement of the drive shaft 11. With the pin 9 reaching one end of the longitudinal groove 10 a further displacement of the drive shaft 11 is not possible. The length of the longitudinal groove 10 determines the maximal axial displacement of the drive shaft 11.

The camera lens 2 comprises an iris ring 15 for the adjustment of the iris diaphragm and further lens rings for adjusting the zoom and the focus. The iris ring 15 has external teeth 19 around its rim. The pinion 12 engages teeth 19 and transmits the rotation of the drive shaft 11 to the iris ring 15 to cause adjustment of the iris ring 15.

The bevelled sides of the flanges 13, 14 which face the pinion 12 each abuts a lateral working surface 16, 17 of the iris ring 15 thus fitting around and embracing a sector of the iris ring 15. With the pinion 12 engaging the teeth 19 of the iris ring 15, the iris ring 15 is captured by the flanges 13, 14. The ability of the iris ring 15 to rotate is not restricted by the flanges 13, 14, as they move along with the pinion 12. The wedge-shaped design of the contacting sides of the flanges 13, 14 produces an enlarged contacting surface between the flanges 13, 14 and the lateral working surfaces 16, 17 of the iris ring 15.

During axial displacement of the iris ring 15, caused for example by an adjustment of the focus ring, the flanges 13, 14 are carried along. With the flanges 13, 14 connected to the drive shaft 11, displacement of the iris ring 15 automatically causes axial displacement of the drive shaft 11. At the same time on-going transmission of the rotation of the drive gear 8 to the drive shaft 11 is assured by the special design of the drive shaft 11 as explained above. As the drive gear 8 is secured to the motor unit 4, it is prevented from moving axially. With the axial displacement of the drive shaft 11 determined by and corresponding to the axial displacement of the iris ring 15, the pinion 12 stays engaged with the external teeth 19 of the lens ring 15 during the axial displacement of a lens ring.

FIGS. 4a and 4b show two positions of a drive unit 3 and a camera lens 2. The iris ring 15 is situated at the very front of the camera lens 2. The pinion 12 engages the external teeth of the iris ring 15. Referring to FIG. 4a, the iris ring 15 and the drive shaft 11 are displaced maximally toward the camera box and the left end of groove 10 (as viewed in FIG. 2) moves against pin 9. Referring to FIG. 4b, after having adjusted the focus ring 20, the iris ring 15 is displaced away from the camera box and the right end of groove 10 moves toward pin 9. This goes along with a corresponding displacement of the drive shaft 11 during which the engagement of the pinion 12 in the teeth of the iris ring 15 remains unchanged.

In another embodiment of the invention (not shown), a drive unit 3 is coupled to the zoom ring of the camera lens 2. During adjustment, the rotation of the zoom ring causes it to move along the lens axis. As with the iris ring, the drive shaft 11 and the pinion 12 are carried along via the flanges 13, 14 to assure continuous coupling of the pinion 12 and the zoom ring and thus a continuous adjustment.

The corresponding laid open for public inspection German patent application No. DE 4220129 filed on Jun. 17, 1992 is incorporated fully herein by reference.

While the invention has been described in detail with respect to certain preferred embodiments, it should be understood that the invention is not limited to those precise embodiments, and that those embodiments are instead representative examples of the many modifications and variations which would present themselves to those of skill in the art without departing from the scope and spirit of this invention, as defined in the appended claims.

What is claimed is:

1. A drive unit for adjusting a position of a zoom lens ring, focus lens ring or iris lens ring of a camera, the lens ring having external teeth and being axially movable, comprising:

a motor unit;

a drive shaft connected to the motor unit, with the drive shaft arranged parallel to an axis of the camera;

means for allowing an axial displacement of the drive shaft;

a pinion connected to the drive shaft and coupled to the external teeth of the lens ring; and means connected to the drive shaft for embracing a sector of the lens ring to effect the axial displacement of the drive shaft and pinion in response to an axial displacement of the lens ring.

2. The drive unit of claim 1, wherein the means for embracing a sector of the lens ring comprises two substantially circular flanges which are attached to the drive shaft at each side of the pinion and which each abut against a lateral working surface of the lens ring.

3. The drive unit of claim 2, in which the flanges are fixed to the pinion.

4. The drive unit of claim 2, in which the surface of each flange has a wedge-shaped bevel towards the pinion.

5. The drive unit of claim 1, wherein the means for allowing an axial displacement of the drive shaft comprises:

a drive gear disposed on the drive shaft, wherein the drive gear is an axially fixed member of the drive unit and is rotated by the motor unit;

a longitudinal groove within the drive shaft;

a pin connected to the drive gear for engaging the groove, thereby transmitting rotation of the motor unit to the drive shaft, the axial displacement of the drive shaft being accommodated by an axial displacement of the groove along the pin in response to axial displacement of the pinion by the lens ring.

* * * * *